United States Patent [19]

Bognaes et al.

[11] E Re. 29,463

[45] Reissued Nov. 1, 1977

[54] TANKER FOR LIQUIFIED AND/OR COMPRESSED GAS

[75] Inventors: Ragnar Bognaes, Jeloy; Olav Solberg, Oslo, both of Norway

[73] Assignee: Kvaerner Brug A/S, Olso, Norway

[21] Appl. No.: 752,897

[22] Filed: Dec. 21, 1976

Related U.S. Patent Documents

Reissue of:

[64] Patent No.: 3,680,323
Issued: Aug. 1, 1972
Appl. No.: 81,101
Filed: Oct. 15, 1970

[30] Foreign Application Priority Data

Oct. 10, 1969 Norway ..... 694145

[51] Int. Cl.[2] ..... F17C 13/08

[52] U.S. Cl. ..... 62/55; 114/74 A; 220/15

[58] Field of Search ..... 62/45, 55, 240; 114/74 A; 220/9 LG, 15

[56] References Cited

U.S. PATENT DOCUMENTS

| | | | |
|---|---|---|---|
| 1,806,508 | 5/1931 | Smith | 114/74 A |
| 2,363,992 | 11/1944 | Reiser | 248/194 |
| 2,417,053 | 3/1947 | Boardman | 220/1 |
| 2,523,274 | 9/1950 | Boardman | 248/146 |
| 2,690,273 | 9/1954 | Arne | 220/1 |
| 2,769,563 | 11/1956 | Weil | 220/9 LG |
| 2,901,592 | 8/1959 | Rossheim | 219/137 |
| 2,955,723 | 10/1960 | McGrath | 220/20.5 |
| 2,993,460 | 7/1961 | Dreyer | 114/74 A |
| 3,011,321 | 12/1961 | Clauson | 114/74 A |
| 3,037,657 | 6/1962 | Hampton et al. | 220/15 |
| 3,087,883 | 4/1963 | Haftke | 204/193.2 |
| 3,114,344 | 12/1963 | Meade | 114/74 A |
| 3,129,836 | 4/1964 | Frevel | 220/1 |
| 3,224,623 | 12/1965 | Knox, Jr. et al. | 220/9 LG |
| 3,276,412 | 10/1966 | Estes et al. | 114/74 A |
| 3,280,778 | 10/1966 | Leathard | 220/15 |
| 3,280,779 | 10/1966 | Breit, Jr. | 114/74 A |
| 3,295,791 | 1/1967 | Black | 220/15 |
| 3,331,525 | 7/1967 | Coehn | 220/15 |
| 3,355,135 | 11/1967 | Bengtsson | 248/350 |
| 3,380,611 | 4/1968 | Brougham et al. | 220/15 |
| 3,403,651 | 10/1968 | Gilles | 114/74 A |
| 3,422,779 | 1/1969 | Becker | 114/74 A |
| 3,428,205 | 2/1969 | Basile et al. | 220/15 |
| 3,507,242 | 4/1970 | Ulbricht | 114/74 A |
| 3,671,315 | 6/1972 | Iarossi | 114/74 A |

FOREIGN PATENT DOCUMENTS

| | | |
|---|---|---|
| 1,029,254 | 4/1958 | Germany. |
| 1,250,289 | 9/1967 | Germany. |
| 151,133 | 6/1959 | Japan. |
| 102,309 | 5/1958 | Norway. |
| 399,518 | 10/1933 | United Kingdom. |
| 476,713 | 12/1937 | United Kingdom. |
| 612,973 | 11/1948 | United Kingdom. |
| 802,790 | 10/1958 | United Kingdom. |
| 818,073 | 8/1954 | United Kingdom. |
| 820,037 | 9/1959 | United Kingdom. |
| 910,224 | 11/1962 | United Kingdom. |
| 959,166 | 5/1964 | United Kingdom. |
| 1,000,297 | 8/1965 | United Kingdom. |
| 1,058,206 | 2/1967 | United Kingdom. |
| 1,175,323 | 12/1969 | United Kingdom. |
| 1,179,368 | 1/1970 | United Kingdom. |
| 1,179,369 | 1/1970 | United Kingdom. |
| 1,205,780 | 9/1970 | United Kingdom. |

OTHER PUBLICATIONS

Comm. Report, Amer. Welding Society: "Fabrication of Welded Rocket Motor Cases," 1961, pp. 23 & 26.
Schimpke, P. U. Horn; H. A. Praktisches Auslage Band 3, 1951, Springer-Verlag, Berlin/Gottingen/Heidelberg, pp. 291-324.
Marine Engineering/Log, 8/1961, pp. 56-59 & 70.
Principles of Naval Architecture, p. 201, Society of Naval Architects & Marine Engr., 1939.
"Code of Fed. Regulations" Title 46, pp. 260, 1, 453.

*Primary Examiner*—Ronald C. Capossela
*Attorney, Agent, or Firm*—Harold L. Stults; Pasquale A. Razzano; Curtis, Morris & Safford

[57] ABSTRACT

In a marine vessel having a hull structure for transporting or storing a cargo tank adapted to contain liquefied and/or compressed gas, the tank is supported by an annular skirt having opposed edges integrally secured respectively to the hull structure and to a peripheral portion of the tank; the skirt minimizes the stresses transferred between the tank and the hull structure and is adapted to accommodate changes in the dimensional characteristics of the tank, due to temperature changes therein, independently of the hull structure.

31 Claims, 16 Drawing Figures

Fig. 1
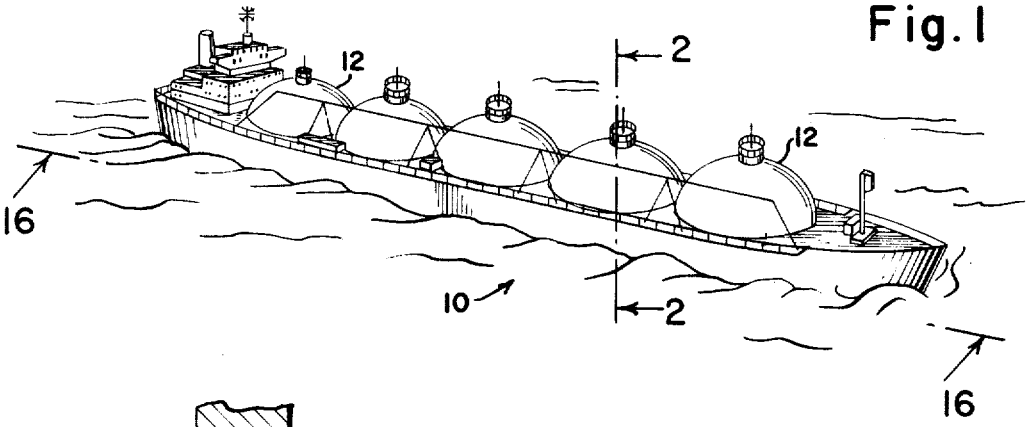
Fig. 7
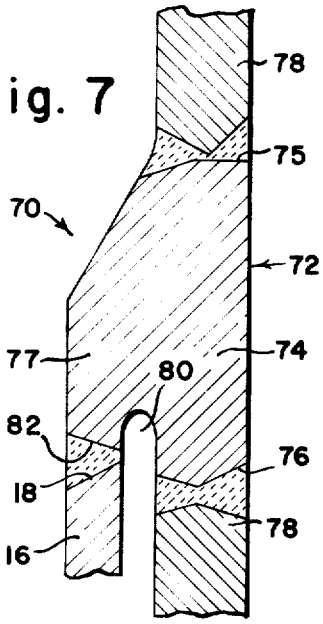
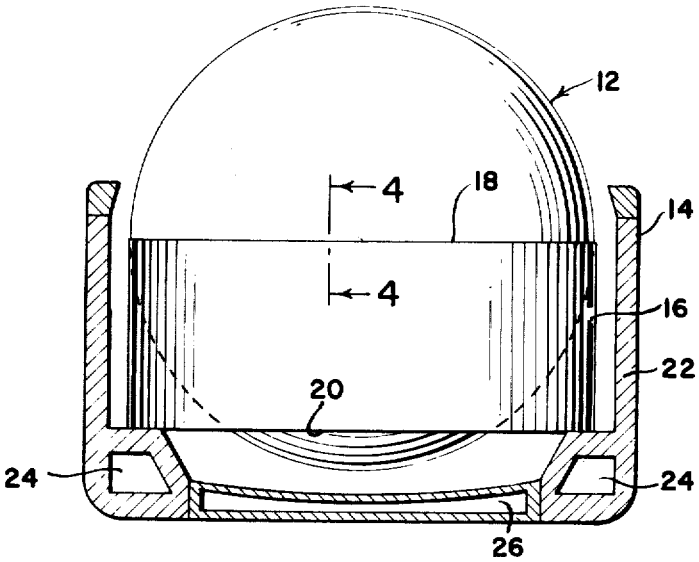
Fig. 2
Fig. 3
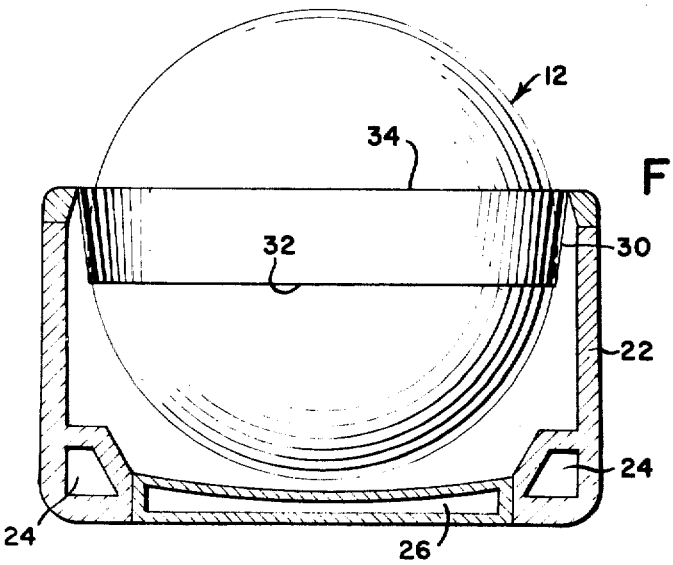
INVENTORS
Ragnar Bognaes
Olav Solberg
BY
Curtis, Morris & Safford
ATTORNEYS INVENTORS
Ragnar Bognaes
BY Olav Solberg
Curtis, Morris & Safford
ATTORNEYS INVENTORS
Ragnar Bognaes
Olav Solberg
BY
Curtis, Morris & Safford
ATTORNEYS INVENTORS
Ragnar Bognaes
Olav Solberg
BY
Curtis, Morris & Safford
ATTORNEYS INVENTORS
Ragnar Bognaes
Olav Solberg
BY
Curtis, Morris & Safford
ATTORNEYS

TANKER FOR LIQUIFIED AND/OR COMPRESSED GAS

Matter enclosed in heavy brackets [ ] appears in the original patent but forms no part of this reissue specification; matter printed in italics indicates the additions made by reissue.

This invention relates to the storage and transportation of liquified and/or compressed gas (hereinafter referred to simply as "liquified gas") in a cargo tank on board a marine vessel, and more particularly to a method and apparatus for supporting the cargo tank in the hull structure of the vessel.

The safe and efficient storage and transportation of liquified natural gas, as for example liquified methane at −260° F, has presented numerous problems to the shipbuilding industry. These problems arise from various sources, and in particular from the static and dynamic movements, deflections, or deformations of the vessel structure in response to cargo loading and wind and wave forces as well as from stressed produced by the extreme temperature variations in the tank when loaded and unloaded, which extremes cause severe thermal expansions and contractions of the tank structure.

When gas tank for liquified gas are mounted on the shore, strong and rigid supporting structures are used to great advantages. However, such structures are too large and cumbersome for use in shipboard applications. Moreover, such conventional shore based tank support systems would have to be substantially altered in order to withstand the various forces that are imposed on a vessel during an ocean voyage.

Because of these severe problems, certain regulatory and classification agencies now maintain specific regulations with regard to the marine transportation of liquified gas. As a result, numerous special mounting systems have previously been proposed for shipboard application to liquified gas carriers in order to conform to these regulations and to safely and efficiently transport this type of cargo. One such method presently in use is to contain the liquified gas in a double walled tank, which tank system is resiliently supported in the vessel to minimize transference of stresses from the hull structure to the tank itself and to accommodate small relative motions between the hull and tanks, as caused by temperature and strain differences. Such arrangements are excessively expensive to build in that duplicative tank systems are required and the supporting structure is relatively complex. Further, construction of the tank is complicated by the fact that the outer tank must be built around the inner tank, and once the tank walls are completed, certain of the weld seams of the structure may not be inspected and tested.

Other known methods of transporting liquified gas on a vessel include the so-call "integrated" or membrane tank structure wherein the cargo tank is constructed of light or thin material not intended to be loaded appreciably in its own plane, and which contains the cargo by transmitting the cargo pressure normally (perpendicular to the membrane) to the hull structure. Such tank structures are double walled (primary cargo barrier plus secondary barrier) cargo containing systems. Still other liquified gas containment systems are such that the secondary or emergency backup cargo tank is made an integral part of the ship hull itself and the primary cargo tank is independent of the ship's hull, but supported by the hull.

It should be noted that all of the liquified gas containment systems discussed thus far are made up of a primary barrier (or cargo tank which contains the loading during normal operating conditions) and a secondary barrier, external to the primary barrier. (The secondary barrier is provided and designed so that it should be able to safely contain the contents of the primary barrier in the event of failure of the primary barrier, thus protecting the ship's hull from brittle fracture). Such dual systems are difficult to build and require inordinate amounts of time spent at the building dock or way to accommodate the tank construction. Further, variations in the mounting structures and the specific dimensions and the various mounting connections cause eccentric and uneven forces to be applied to the tank, thereby producing undesirable stress concentrations therein. These stresses substantially increase the dangers of structural failure of the tank. The concentrated stresses are generally located at an interface between the tank and the support structure, and the generally eccentric connections between the tank and the supporting structure result in uneven forces applied to the tank and in uneven areas of stress concentrations within the tank wall. Because of these stress concentrations a leak or puncture in the tank wall may well result in immediate catastrophic failure of the tank. If the cargo being carried is liquified gas, such a failure would release the liquid into the hull, causing an almost immediate brittle failure of the hull structure, were it not for the presence of the secondary barrier which contains the leakage and protects the hull.

Accordingly, it is an object of the present invention to transport liquified gas in a marine vessel which is relatively simple and inexpensive in construction.

Another object of the invention is to transport liquified gas in a single walled pressure vessel type tank, without the need for a liquid containing secondary barrier, but with a liquid deflecting thermal spray shield.

Another object of the invention is to transport liquified gas in independently constructed pressure vessels integrally secured to the hull structure of a marine vessel.

Another object of the invention is to predetermine the stresses to which all parts of a cargo tank for liquified gas are subjected during all service conditions and modes of operation.

It is another object of the invention to provide an integrated transportation system (of ship's hull and cargo tank) for liquified gas in which the stresses to which the system is subjected are accurately predetermined in those areas which influence cargo containment.

Yet another object of the invention is to minimize stress concentrations within the walls of the cargo tank.

Another object of the invention is to predetermine the probability or occurrence of, the maximum size of, and the growth rate of defects or flaws, such as hairline weld cracks, in the tank system, and by the use of fracture mechanics, ascertain and ensure that any such defect or flaw possible in the tank system may not lead to major or catastrophic failure of the tank without such failure having been preceeded by a very lengthy period of minor, slow gas discharge and local liquid spray from the point of inception of the defect or flaw.

An object of the invention is to ensure, through the determinate integration of (1) tank system stress analysis, (2) tank system material fracture mechanics analysis, and (3) tank system quality control, that the liquified gas containment system is a "fail safe" and "leak before catastrophic failure" type system.

Still another object of the invention is to transport liquified gas in board a marine vessel by a cargo tank and supporting structure which provides added rigidity to the hull structure of the vessel.

A still further object of the invention is to resiliently support a tank for liquified gas on board a marine vessel.

Another object of the invention is to install a liquified gas tank in an existing marine vessel, such that the vessel may so be converted to a liquified gas tankship without the need for additional and installation of a secondary barrier.

In accordance with an aspect of this invention, apparatus is provided for storing liquified gas on board a transport marine vessel in which an independently constructed cargo tank, adapted to contain liquified gas under several atmospheres of pressure, is supported by supporting structure integrally secured to the tank and the hull structure of the vessel. The supporting structure, in one embodiment, includes an annular skirt welded at one edge to a peripheral portion of the cargo tank and welded at its opposed edge to the hull structure, thereby to provide additional rigidity to the hull structure and minimize the transference of stresses from the hull structure to the tank. In addition, the supporting skirt is adapted to accommodate changes in the dimensional characteristics of the cargo tank due to temperature changes in the tank during loading and unloading of the liquified gas and to isolate these dimensional changes from the hull structure, thereby relieving the application of these stresses to the hull. By the accurate and generally tangential securement of the supporting skirt to the pressure vessel cargo tank and to the hull structure, the stresses within the skirt and the tank may be accurately predetermined so that the tank may be designed to provide a "fail safe containment" in that the stress levels and materials in the tank and supporting structure may be selected so that the tank will merely gas leak and then liquid spray leak if the tank wall is cracked, while, due to the stress determinacy of the tank system, the possibility of catastrophic failure is eliminated. Utilization of a supporting skirt also provided a favorable transference of forces between the hull structure and the tank since the skirt is connected immediately adjacent and substantially tangentially to the tank and thus avoids the large eccentricities provided by previously proposed supporting structures. Further, since a single walled vessel is utilized as a cargo tank, and since the support skirt structure is relatively simple and facilitates non-destructive testing of the tank, skirt and connections therebetween, the stresses to which the tank and support structure will be subjected can be readily determined and documented. As a result, the safety requirements of the various regulating bodies are met and no outer gross liquid containing secondary barrier type safety tank is required. A liquid spray protector is installed between the cargo tank and those parts of the adjacent hull structure which could be sub-cooled by spray gas or spray liquid leakage from a minor defect such as a crack, in the tank. This protector is installed so as to deflect sprayed cargo liquid downward and inboard to the tank top below the cargo tank, from whence liquid accumulations are removed.

The above, and other objects, features and advantages of this invention, will be apparent in the following detailed description of illustrative embodiments thereof which embodiments are to be read in connection with the accompanying drawings wherein:

FIG. 1 is a perspective view of a ship of the type in which the present invention may be employed;

FIG. 2 is a schematic view partly in section taken on line 2—2 of FIG. 1, showing one embodiment of the tank support system of the present invention;

FIG. 3 is a view, similar to FIG. 2 of another embodiment of the tank support system;

FIG. 7 is a sectional view similar to FIG. 6 of yet another embodiment of the interface structure;

Figure 4:
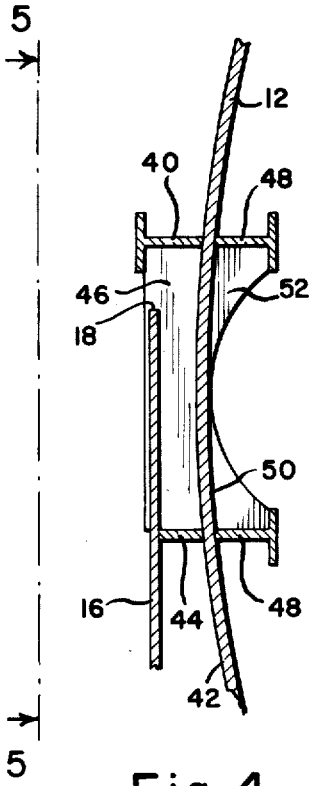
FIG. 4 is a sectional view taken on line 4—4 of FIG. 2, and illustrating one embodiment of an interface structure between the cargo tank and supporting skirt.

Referring to the drawings in detail, and initially to FIG. 1 thereof, it will be seen that a ship 10 of the type in which the present invention may be employed contains five spherical tanks 12 which are mounted in the ship's hull and which are adapted to contain liquified gas, such as for example, methane, ethylene, propane and chlorine. It is noted that while the illustrative embodiment of this invention, only five tanks 12 have been illustrated, it is contemplated that more or less of such tanks may be provided on marine vessels to meet varying operational requirements.

Tanks 12 are formed by plate construction preferably by utilizing full penetration welding which is readily subjected to non-destructive testing. Such tanks are readily fabricated to the high standards required in the shipping industry and they may constitute pressure vessels which may be adapted to contain liquified gas at moderate pressures, as for example, a few atmospheres.

In the preferred embodiment of the present invention, tanks 12, as seen in FIG. 2, are directly mounted to hull 14 of ship 10 by skirt structure 16. Skirt 16 is formed of a plurality of plates welded together, again preferably to full penetration welding, to form an integral annular support structure which is welded at its top edge 18 to the periphery of tank 12 along the latter's equatorial plane. The opposed edge 20 of skirt 16 is welded directly to the hull structure 22 of ship 10 and thus an integral structure is formed including hull structure 14, skirt 16 and tank 12.

Figure 16:
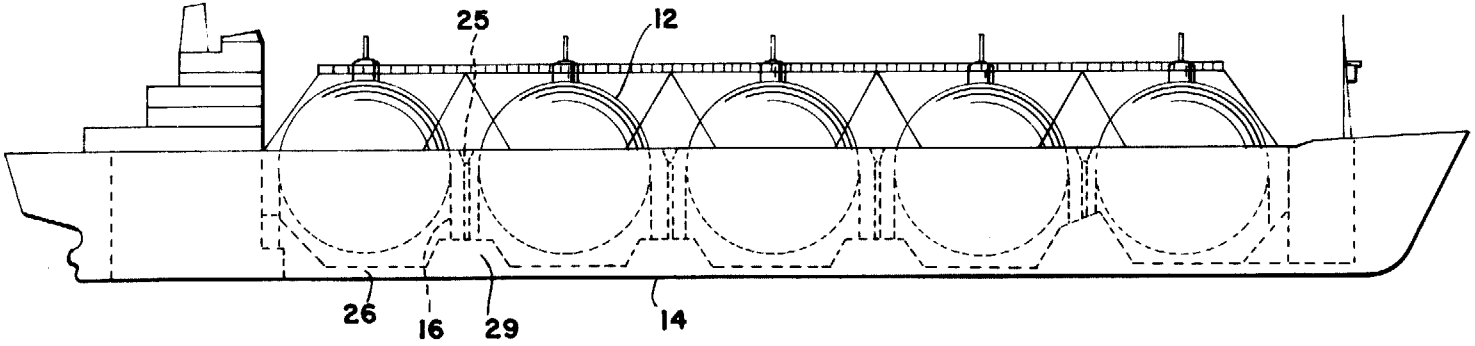
FIG. 16 is a longitudinal sectional view taken on line 16—16 of FIG. 1.

A spherical tank 12 is utilized in the preferred embodiment, since the volumetric efficiency of the tank is a maximum as compared to other tanks, and since the tank occupies a minimum amount of space in the ship's hull. Further, this spherical structure leaves room within the already determined hull dimensions for bottom longitudinal ring tanks 24 and bottom transverse tanks 29 (see FIG. 16) for carrying ballast or fuel. These tank structures, together with longitudinal structures, deck 27 and cross structures 25, increase the torsional and bending stiffness of the hull. Tanks 26, located below tanks 12, are double bottom fuel or ballast tanks.

The support system of the present invention is stress determinant, that is, since tank 12 is integrally secured to the hull structure of ship 10, the stresses transferred between the tank and hull structure due to the stresses to which the ship is subjected and to the thermal stresses produced in loading and unloading of the tank may be accurately determined. The accurate determination of the stresses is achieved due to the accurate and specific connection of the skirt to the tank. Specifically, since the point of connection of skirt 16 with tank 12 is accurately known and since it is substantially tangential to the tank itself, the stresses to which the tank will be subjected may be accurately determined prior to installation of the tank within the ship. Thus, the tank and its support system may be accurately designed to transmit minimum stresses to the tank itself so that in the event of a tank leak, catastrophic failure thereof will not occur.

The integral connection of skirt 16 with the hull also provides added rigidity to the hull, thereby increasing its capability to withstand torsional and rotational loads due to wind and wave forces, and thereby also decreasing the stresses transmitted to tank 12. However, the relatively large height of skirt 16 provides appropriate elastic stress distribution which is beneficial for structural response to hull movements.

As mentioned above, preferably skirt 16 is welded directly to tank 12 although, as more fully described hereinafter, the skirt may be connected to the tank through appropriate interface structures. Due to the accurate connection between the tank skirt and hull structure, the variations in stress due to the thermal contractions and expansions of the tank during loading and unloading may also be accurately determined so that the stress levels produced by these thermal movements may be determined and designed for. By the use of the stress determinant tank and support system of the present invention, it is possible to accurately document the stress levels of the structure so that the safety requirements of the various international shipbuilding regulatory bodies, and particularly the normal requirements concerning the need for a second protective tank can be satisfied, and such a second liquid containing tank may be eliminated in favor of a minor spray protection system.

As seen in FIG. 2, skirt 16 is a cylindrical member which is secured to the lower portions of the hull. However, it is contemplated that other structural arrangements may be utilized, as for example as illustrated in the embodiment of FIG. 3, wherein skirt 30 is provided which is secured along one edge 32 thereof to the peripheral surface of tank 12 at approximately the equatorial plane of the tank. In this embodiment, skirt 30 is a generally frustro-conical member having its base edge 34 secured to the upper areas of the hull structure 22 so that the tank is suspended from the hull structure rather than seated thereon as in the case in the embodiment of FIG. 2. The connection between edge 32 and tank 12 may be either a direct welded seam or may comprise an interface structure such as for example, one of the interface structures described hereinafter. Although the preferable location for the connection between the skirt and the tank is at the equatorial plane of the tank, it is contemplated, as seen in FIG. 3, that the connection may be made at some other location, as for example, slightly below the equatorial plane. Equally satisfactory results will be obtained from such a supporting system.

As mentioned, instead of direct welding of the edge 18 of skit 16 to tank 12, an interface structure may be provided which will also provide the stress determinant characteristic of the supporting system by providing an accurate determination of the location of the skirt with respect to the tank, so that stresses therein may be predetermined before the tanks are secured to the ship. One such interface structure is illustrated in FIG. 4, wherein an annular generally T-shaped structural member 40 is secured to the peripheral outer surface of tank 12 slightly above the equatorial plane thereof. A generally flat structure member 44 is similarly secured to surface 42 at a position somewhat below the equatorial plane. Members 40 and 44 are interconnected by evenly spaced vertical plates 46 which are integrally secured, as by welding, to the surface 42 of tank 12 and to members 40 and 44 themselves. Top edge 18 of skirt 16 is welded to vertical plates 46 to provide an integral supporting structure therewith for tank 12. In this manner the specific location of skirt 16 with respect to tank 12 is known before the tank is installed within the ship so that the advantages of the previously discussed embodiment, which also provides a stress determinant supporting structure, are retained.

Figure 5:
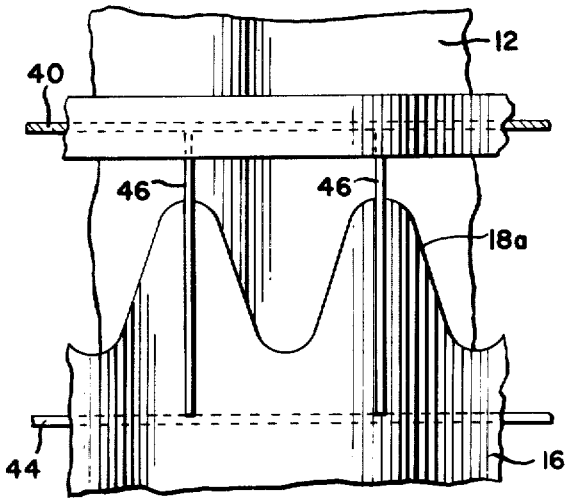
FIG. 5 is an end view taken on line 5—5 of FIG. 4.

In order to obtain additional bracing of tank 12 in the areas of this interface structure, two additional generally T-shaped structural members 48 are secured, as by welding, to the inside surface 50 of tank 12 in locations opposite members 40 and 44 respectively. Further structural stability is obtained by integrally connecting members 48 by vertically extending plates 52 welded to both inside wall 50 and to both of members 48. While top edge 18 of skirt 16 may be a generally straight edge, it is contemplated that other convenient configurations may be suitable for use with this interface structure, as for example, as illustrated in FIG. 5 wherein it is shown that a generally sinusoidally shaped edge 18a is utilized in securing skirt 16 to plates 46.

Figure 6:
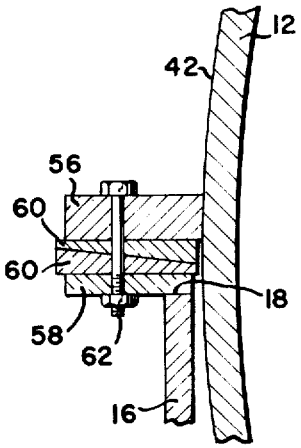
FIG. 6 is a sectional view similar to FIG. 4 showing another embodiment of the interface structure.

Yet another embodiment of the supporting system of the present invention for attaching the skirt 16 of tank 12 is illustrated in FIG. 6 wherein it is seen that a generally horizontal annular flange 56 is welded directly to exterior peripheral wall portion 42 of tank 12 at the equatorial plane thereof. A second generally flat horizontal flange 58 is similarly welded to top edge 18 of skirt 16 and extends radially outwardly of tank 12 and is substantially contiguous with flange 56. A pair of adjustable wedges 60 is inserted between flanges 56 and 58 to provide an adjustment for the relative positions between flanges 56 and 58 so that a predetermined spacing between these members may be achieved to provide the desirable stress determinant characteristic of the prior embodiments. Flanges 56 and 58 may be secured in the desired predetermined position in any convenient manner and preferably the flanges are bolted together by bolt assemblies 62 at evenly spaced locations about the periphery of the tank.

Yet another embodiment of interface structure 70 adapted for use in the present invention is illustrated in FIG. 7. Interface structure 70 comprises a generally annular ring 72 forming an integral part of tank 12 and is welded at opposed edges 75 and 76 to adjacent plates 78 of the tank itself. Ring 72 has a first portion 74, having substantially the same width as tank plate 78, and a second or extension portion 77 which is integral with portion 74. Extension 77 provided ring 72 with somewhat greater width than adjacent tank plate 78 and is defined by groove 80 formed in lower surface 82 thereof. Lower surface 82 of extension 77 is secured, by welding, to top edge 18 of skirt 16. The [dimensions] provides the same stress determinant characteristics of the prior embodiments, and this groove is preferably chosen to be generally elliptical in configuration, as seen in the drawings, to provide minimum stress concentrations at the critical area of connection between the tank and the skirt where the stress transference therebetween occurs. However, it is contemplated that other convenient configurations may also be chosen for groove 80, and in particular it is foreseen that square or rectangular grooves may also be utilized.

Figure 8:
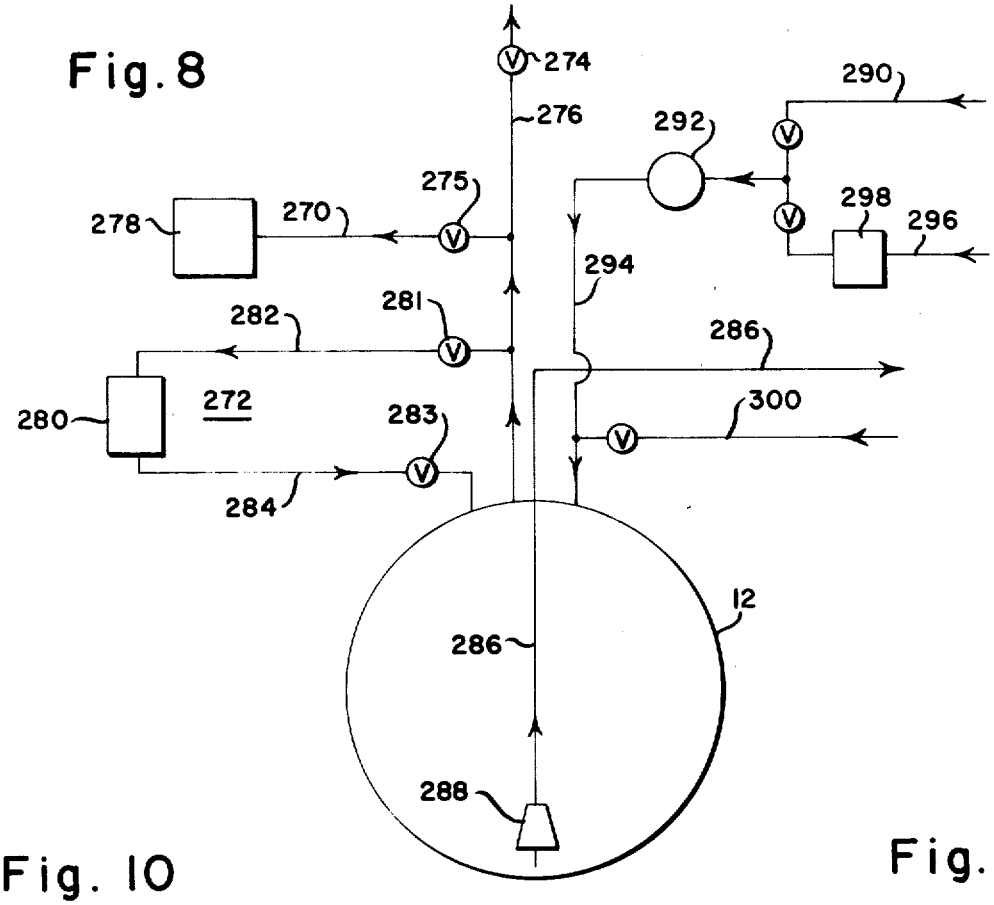
FIG. 8 is a schematic diagram illustrating a refrigeration system adapted for use in the present invention.

Loading of each of the tanks 12 in the previously discussed embodiments may be initiated by spray nozzles (not shown) which are adapted to spray the interior surfaces of the tank with liquified gas before the bulk of the cold liquid is introduced. In this way the tank is slowly cooled in order to eliminate any possible failures by thermal shock by contact of the extremely cold liquified gas with the tank walls [with] *which* are at ambient temperatures. Referring to FIG. 8 of the drawings, a refrigeration system which is utilized to control the temperature of the gas after loading, is illustrated. As seen therein, two refrigeration systems 270 and 272 either or both of which may be used in a ship constructed in accordance with the present invention, are provided.

System 270 utilizes the evaporation of liquified gas in tank 12 to keep the gas at a low temperature. In this system, as the liquified gas evaporates within the tank 12 it absorbs heat of vaporization from the surface of the enclosed liquid, thus maintaining the low temperature of the liquid therein. After evaporation, the gas is discharged from tank 12 either through pressure relief valve 274 in discharge line 376 to the atmosphere or through gas control valve 275 in discharge line 276 to the ship's boilers or propulsion system 278, for use as fuel therein. The evaporating gas absorbs enough heat in this system to cool the liquified gas to a temperature below its condensation temperature.

The second refrigeration system 272 which may be employed to refrigerate the liquified gas within the tank 12 requires utilization of a two or three stage refrigeration system 280. The evaporation gas within 12 is withdrawn from the top thereof, through valve 281, liquified by the refrigeration system, and returned to the tank through valve 283. As seen in the drawing, the vaporous gas is taken from the top of tank 12 through conduit 276 and 282 to the two stage refrigeration system 280, which may be of conventional construction, and which converts the vaporous gas back to its liquid phase. The resulting liquid is then returned to tank 12 through line 284. Since this refrigeration system requires relatively heavy, complex, and expensive equipment, it is utilized only for the more expensive gases such as ethylene, which gases do not require the extremely low temperatures (as for example less than −160° F) that are necessary to maintain other gases in their liquid state.

Normally liquified gas within tank 12 will be unloaded through conduit 286 by pump 288, while gas vapor is returned from shore through conduit 300 to maintain a positive pressure in the tank as liquid is removed. However, in case of failure of pump 288, alternative methods are available for unloading. In one of these methods gas is drawn from another cargo tank or from ashore through conduit 290 and pumped through compressor 292 into the cargo tank through conduit 294. Alternatively, liquid may be withdrawn from another cargo tank or from ashore through conduit 296, vaporized in heat exchanger 298 and passed through the compressor to the cargo tank. Both of these systems pressurize the tank. Heater 298 may also be utilized during normal loading and unloading operations to prevent the formation of a vacuum in the tank as liquified gas is unloaded, thereby maintaining at least a pressure balance on either side of the tank with the atmosphere.

Figure 9:
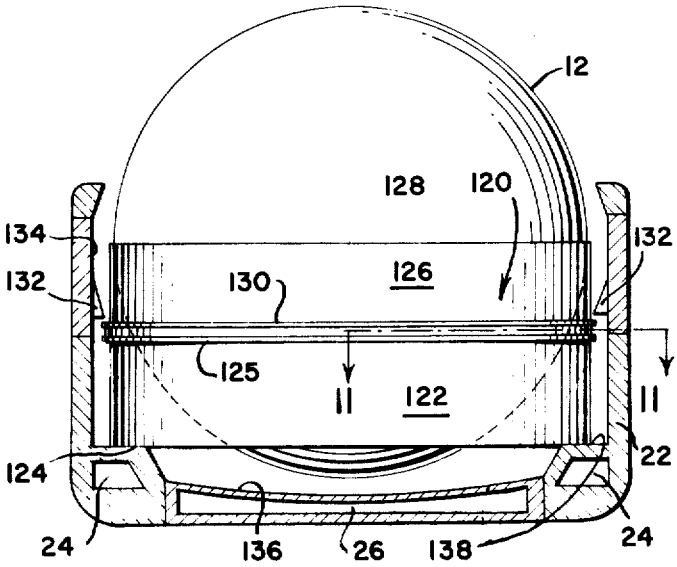
FIG. 9 is a sectional view similar to FIG. 2 of another embodiment of the present invention.

Referring now to FIG. 9, there is illustrated another embodiment of the present invention also adapted to utilize the above described refrigeration systems and having tank 12 supported within hull structure 22 by a two-piece skirt structure 120. In this embodiment, skirt structure 120 includes a cylindrical foundation skirt 122 welded to the ship's hull structure 22 along an annular seam 124. Foundation skirt 122 is provided with a top generally flat annular flange 125, which is adapted to support tank 12 through upper skirt 126. Skirt 126 is welded along its top edge 128 to the equatorial peripheral portion of tank 12, and has a generally flat lower annular flange 130, corresponding to and contiguous with flange 125. Flange 130 is seated on flange 125, and in practice a resilient material may be positioned between the two flanges to provide a resilient support therebetween for tank 12. As more fully described hereinafter, flanges 125 and 130 are also provided with locking devices which prevent longitudinal or lateral movement of flange 130 with respect to flange 125, yet permit contraction and expansion of tank 12 and skirt 16 portion 126 due to thermal variation within the tank, and thereby isolate these thermal movements from lower skirt portion 122 and the hull structure itself.

To prevent dislocation of tank 12, if for example the hull should become flooded so that the tank would be buoyed up, brackets 132 are provided along the sides 134 of hull structure 22. Brackets 132 overlap flange 130 to limit the extent of vertical movement of the tank. Alternatively, vertical movement may be limited by loose bolt connection between flanges 125 and 130.

Skirt portion 126 is, as mentioned, welded to tank 12 in the same manner as the previously discussed embodiments, and accordingly, no secondary barrier or double tank is required since this construction is stress determinant and therefore the tank may be designed such that and defects thereof will cause leaks in the tank but not catastrophic failure thereof. In any event, however, bottom 136 and sides 138 of hull structure 22 of this embodiment and in the previously described embodiments are provided with a thermal insulation lining in order to protect all inner surfaces of the hull from being sprayed by any of the extremely cold liquified gas should a small leak occur within tank 12. In this manner, brittle failure of the hull structure due to contact with the cold liquid is prevented.

Figure 11:
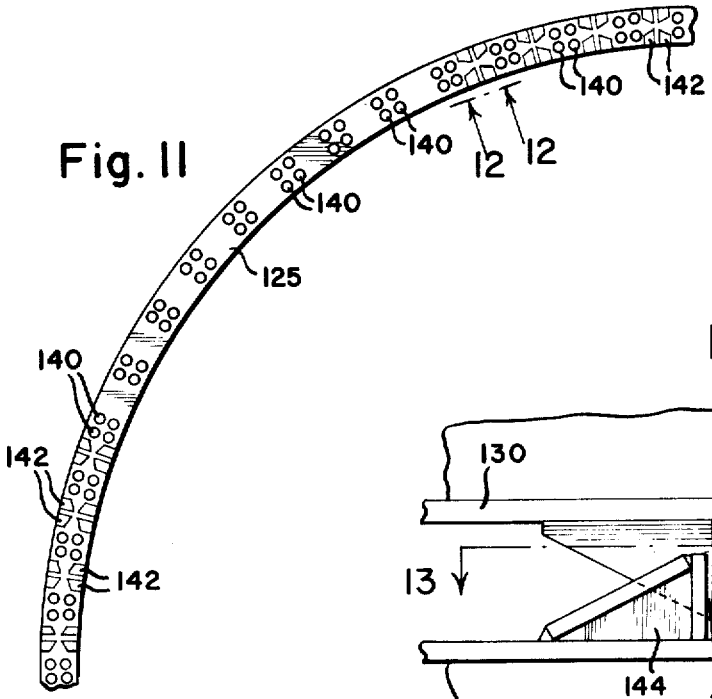
FIG. 11 is a plan view taken on line 11—11 of FIG. 9.

The resilient supporting mechanisms and the locking devices between flanges 130 and 125 are illustrated in FIG. 11. As seen therein, a plurality of resilient pads 140 are positioned along flange 125 are predetermined locations. Generally these pads are formed of a resilient material such as plastic rubber and are evenly spaced in groups of four about the entire flange. At predetermined locations between the pads, and preferably adjacent the longitudinal and transverse axes of the ship, a plurality of locking devices 142 are provided to prevent all but limited movement of tank 12 on flange 125.

Figure 12:
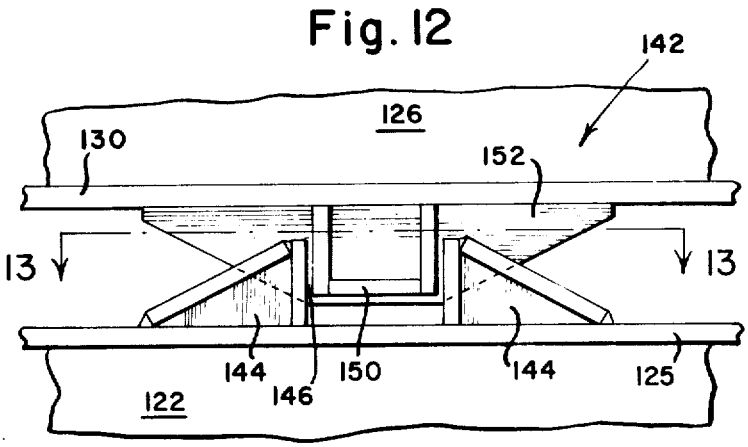
FIG. 12 is an enlarged view of a locking device utilized in the embodiment of FIG. 9 and shown schematically in FIG. 11.
Figure 13:
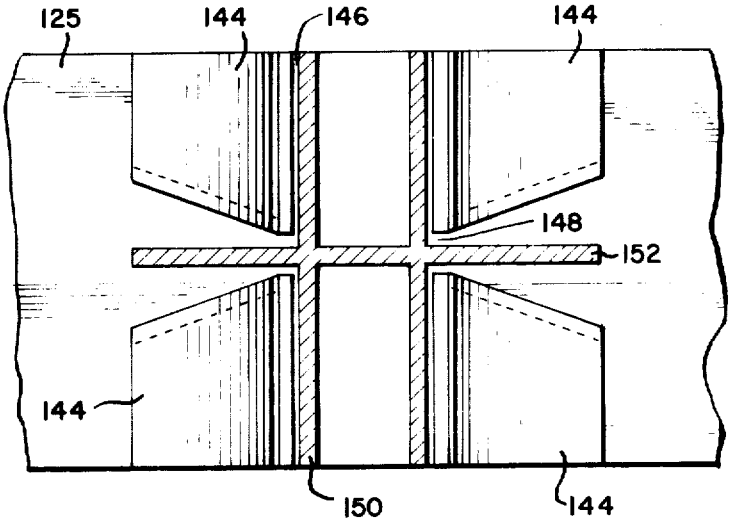
FIG. 13 is a sectional view taken on line 13—13 of FIG. 12.

Locking devices 142 are more clearly illustrated in FIGS. 12 and 13, wherein it is seen that in each locking device 142, four brackets 144 of similar construction are attached to flange 125 on foundation skirt 122. Brackets 144 are positioned to provide a generally radially extending guide groove 146 and a circumferential guide groove 148. Flange 130 is provided with a plurality of depending extensions 150 and 152, which as seen in FIG. 13 are dimensioned to fit within groove 146 and 148 respectively. Extension 150 is a generally rectangular member which is closely fit within groove 146 so that rotational movement of tank 12 with respect to flange 125 is prevented. On the other hand, extension 152 is a relatively thin member which is somewhat narrower than groove 148 so that limited radical movement of the tank 12 with respect to flange 125 is permitted. In this manner, thermal movements of the tank, as a result of contractions and expansions thereof due to the changes in temperature within the tank during loading and unloading may be accommodated and isolated from skirt 122 and hull structure 22.

Figure 10:
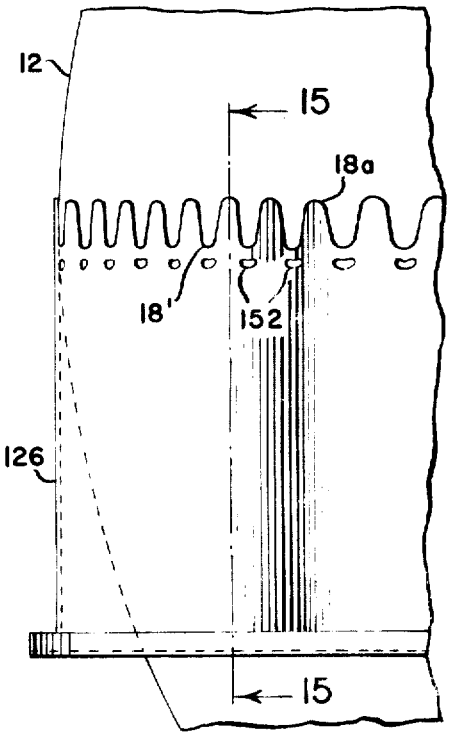
FIG. 10 is an enlarged view of a section of the embodiment illustrated in FIG. 9 showing the connection between the cargo tank and the support skirt.

Upper skirt section 126 is secured, in this embodiment, as seen in FIG. 9 [be] *by* welding of top edge 18 thereof to the exterior surface 42 of tank 12 along a straight line. However, it is contemplated that the top edge of section 126 may be formed in a sinusoidal pattern, as shown in FIG. 10 at 18a, and welded to surface 42 along the line defined thereby, so that a maximum practical length of welding along the edge is provided. This construction may also be utilized in the single integral skirt embodiments previously discussed.

With sinusoidal edge configuration as seen in FIG. 10, stress concentrations tend to develop at the lowermost edges 18' of the wave pattern, since the stresses produced within skirt 126 tend to concentrate at the first areas thereof where they may escape to the adjoining structure. In order to alter the stress distribution patterns and to relieve the stresses produced in this area apertures 152 are formed therein.

Figure 15:
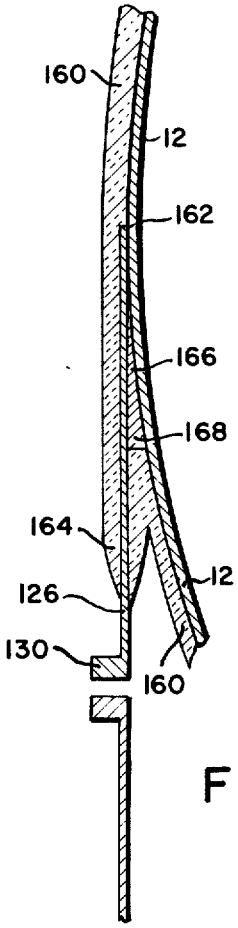
FIG. 15 is an elarged sectional view taken on line 15—15 of FIG. 10.

The previously described embodiment illustrates one method of isolating thermal expansions and contractions of the tank from the lowermost portions of the skirt structure and the hull structure of the ship 10. This result may be further refined by controlling the temperature gradient within the skirt portion 126 so that the flanges 130 and 125 are both maintained at ambient temperatures irrespective of the temperatures within the tank 12 itself. One method of accomplishing this is illustrated in FIG. 15 where it is shown that tank 12 is provided with a covering 160 of thermal insulation material about its entire periphery. Insulation material 160 is extended down along both sides of skirt 126 and is tapered therealong in a controlled manner to a predetermined distance below the point of juncture 162 of the skirt with tank 12. The extent and shape of extension 164 of insulation material 160 is predetermined by heat engineering calculations so that a temperature gradient is achieved in the skirt results in acceptable thermal stresses. Generally the insulation should be designed so that the gradient in the skirt reaches ambient temperature at flange 130.

It is noted that the use of the tapered insulation material is also adaptable for use with the single integral skirt structures of the embodiment shown in FIG. 2 to control the temperature gradient and thermal stresses produced within that skirt structure and to insure that the lowermost portions of the skirt are maintained at ambient temperature to thermally isolate the uppermost portions of the skirt from the hull structure.

Wedge shaped area 166, as seen in FIG. 15, formed between skirt 126 and tank 12 adjacent the point of juncture 162, may be filled with heat conducting material 168 to insure even thermal transmissions between tank 12 and skirt 126 in the region of the point of juncture 162 so that an even temperature gradient is produced in skirt 126 throughout the circumferential extent thereof. In this manner it is assured that no thermal stress concentrations are formed within either skirt 126 of tank 12.

While each of the previously described embodiments have been limited to spherical cargo tanks 12, it is contemplated that other conveniently shaped tanks may be supported by skirt constructions similar to those described above. In particular, it is contemplated that tanks having at least one curvilinear dimension may be conveniently supported by such skirts. Such tanks may be, for example, either elliptical, conical, cylindrical or even egg-shaped. In any of these cases skirt 16 will be secured to the interface structure as aforesaid and its configuration will be in conformity with the associated tank.

Figure 14:
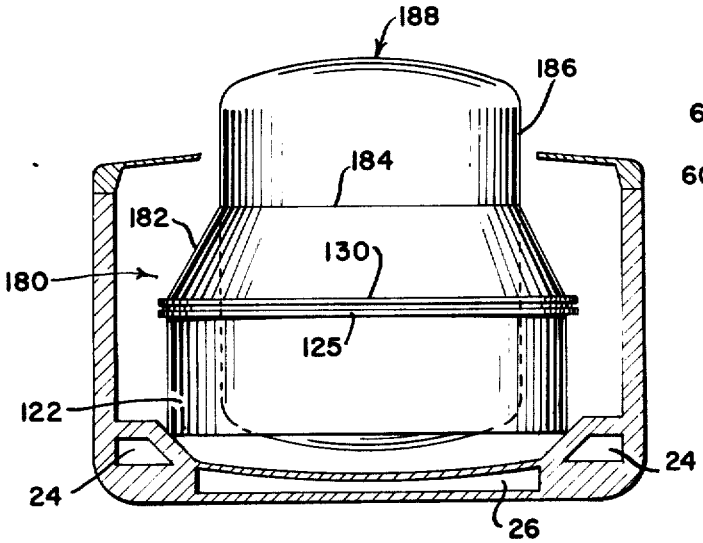
FIG. 14 is a sectional view similar to FIG. 9 of another embodiment of the present invention.

Referring to FIG. 14, a generally conically shaped tank is illustrated which is supported by a two-part skirt 180 similar in construction to the skirt 122 of the embodiment of FIG. 9. In this case however, a generally frustro-conical top skirt portion 182 is provided which is welded along its top edge 184 to the cylindrical surface 186 of tank 188 at a position slightly above its equatorial axis. Skirt 182 is provided with flange 130 which is seated on flange 125 of foundation skirt 122. Flanges 125 and 130 are operatively connected by resilient support means and locking devices as in the previously discussed embodiments. Further, it is contemplated that in lieu of the two-piece support of skirt 180, skirt portion 182 may be integrally joined to hull structure 22 of ship 10 as in the embodiment illustrated in FIG. 1.

Although illustrative embodiments of the invention have been described herein with reference to the accompanying drawings, it is to be understood that the invention is not limited to those precise embodiments and that various changes and modifications may be effected therein to one skilled in the art without departing from the scope or spirit of this invention.

What is claimed is:

1. Apparatus for storing liquified gas in combination with a cargo tank on board a marine vessel having a hull structure, said tank being generally curvilinear in cross section, and said apparatus comprising skirt means operably interconnecting said tank and said hull structure for supporting said tank on said structure, said skirt extending tangentially to said tank and having one end thereof integrally connected to said hull structure and the other end thereof integrally connected to said tank along a peripheral portion thereof, and separate means for maintaining a low temperature condition within said tank to maintain said gas in its liquid phase.

2. Apparatus as in claim 1 wherein said skirt is tangentially secured to said peripheral portion throughout the full curvilinear dimension thereof.

3. Apparatus as in claim 1 wherein said curvilinear peripheral portion is circular and said skirt comprises a generally cylindrical member.

4. Apparatus as in claim 2 wherein said skirt comprises a generally frusto-conical member.

5. Apparatus as in claim 2 wherein said skirt is formed of plate construction.

6. Apparatus as in claim 2 including thermal insulation surrounding said skirt and extending from the point of juncture of said skirt with said tank towards said hull structure, said insulation having a decreasing thickness at points remote from said point of juncture whereby the temperature gradients in said skirt are predetermined.

7. Apparatus as in claim 2 wherein said skirt edges are welded to said tank and said hull structure.

8. Apparatus as in claim 7 wherein the edge of said skirt secured to said tank has a generally sinusoidal configuration whereby a relatively large weld area is provided between said skirt and said tank.

9. Apparatus as in claim 8 wherein said skirt has a plurality of apertures at predetermined locations to distribute stress concentrations therein.

10. Apparatus as in claim 2 including an annular ring of heat conductive material mounted between said tank and said skirt adjacent the point of juncture therebetween, whereby the temperature of said skirt adjacent said point of juncture is substantially the same as that of said tank.

11. Apparatus as in claim 2 wherein said skirt means comprises a first skirt portion secured at one edge to said tank and having an opposed edge remote from the point of juncture of said one edge with said tank, and a second skirt portion having one edge integrally secured to said hull structure and an opposed edge remote from the point of juncture of its first edge with said hull structure, said opposed edges of said first and second skirt portions being positioned adjacent each other and having mutually opposed flange portions operably connected with each other to form said skirt means.

12. Apparatus as in claim 11 wherein said flanges are operably connected by means for [accomodating] *accommodating* changes in the peripheral dimension of said first skirt portion with respect to said second skirt portion due to temperature variations in said cargo tank.

13. Apparatus as in claim 12 wherein said accommodating means prevents rotational movement and lateral movement of said flanges with respect to each other.

14. Apparatus as in claim 12 wherein said accommodating means comprises means for defining radial and circumferential tracks at predetermined locations on one of said flanges and a plurality of radial and circumferential extensions on the other of said flanges adapted to be inserted in said tracks, said radial extensions having substantially the same width as said radial tracks to prevent rotational and lateral movement between said flanges, and said circumferential extensions having a width substantially less than the width of said circumferential tracks, thereby to accommodate changes in the radial dimensions of said first skirt portion with respect to said second skirt portion.

15. Apparatus as in claim 14 including a plurality of resilient pads secured to one of said flanges to provide resilient support between said first and second skirt portions.

16. Apparatus as in claim 3 wherein said tank is spherical and said skirt is tangentially connected thereto at the equatorial plane of the tank.

17. Apparatus for storing liquified gas in combination with a transport carrier, said apparatus comprising a cargo tank being generally curvilinear in cross section and adapted to contain liquified gas, said tank being a pressure vessel for containing said gas under at least atmospheric pressure, and means for supporting said tank on said carrier, said supporting [meanS] *means* being integrally connected at one end to said carrier and integrally connected in tangential relation at its other end along a peripheral portion of said tank, to thermally isolate said tank from said carrier, and separate means for maintaining a low temperature condition within said tank to maintain said gas in its liquid phase, whereby changes in the dimensional characteristics of said tank due to temperature changes in [sand] *said* tank are permitted independently of said carrier.

18. Apparatus as in claim 17 wherein said cargo tank has a generally circular cross section and said supporting means comprises a skirt integrally secured at one end to said tank in tangential relation and integrally secured at its opposed end to the structural members of said carrier.

19. Apparatus as in claim 18 wherein said tank includes an integral peripheral interface structure and said one edge of said skirt is integrally secured to said structure.

20. Apparatus as in claim 19 wherein said interface structure comprises an annular ring having an integral extension extending tangentially to said tank and defining a free end positioned a predetermined distance from said tank, said free end of said extension being integrally secured in abutting relation to said one end of said skirt.

21. Apparatus as in claim 20 wherein said interface structure has an annular groove formed therein between said ring and said extension, said groove having *a* predetermined configuration whereby the stresses transmitted through said skirt to said tank are minimized.

22. Apparatus as in claim 19 wherein said interface structure comprises a pair of vertically spaced parallel structural members secured to the exterior periphery of said [tanks] *tank*, a plurality of generally vertically extending plates secured between said structural members, a pair of vertically spaced parallel structural members secured to the interior of said tank in positions opposite said exterior structural members and a plurality of vertically extending plates secured between said interior structural members to support said tank on said carrier.

23. Apparatus as in claim 19 including means for maintaining a low temperature condition within said cargo tank to maintain said gas in its liquid phase.

24. Apparatus as in claim 18 wherein said skirt member is welded to said cargo tank and the structural members of said carrier.

25. Apparatus as in claim 24 wherein said skirt is of plate construction.

*26. Apparatus for storing liquified gas in combination with a tank on board a marine vessel having a hull structure, said tank being generally curvilinear in cross-section, said apparatus comprising skirt means operably interconnecting said tank and said hull structure for supporting said tank on said structure, said skirt extending tangentially to said tank and having one end thereof integrally connected to said hull structure and the other end thereof integrally connected to said tank along a peripheral portion thereof, separate means for maintaining a low temperature condition within said tank to maintain said gas in its liquid phase, and thermal insulation at least on the outer side of*

*said skirt with respect to said tank extending at least from the point of juncture of said skirt with said tank to a predetermined distance below the point of juncture of said skirt with the tank thereby to control the temperature gradient and thermal stresses produced in said skirt.*

*27. The apparatus as defined in claim 26 wherein said insulation is located on both the inner and outer sides of said skirt.*

*28. The apparatus as defined in claim 27 wherein said tank is covered on its outer surface with insulating material.*

*29. Apparatus for storing liquified gas in combination with a marine vessel, said apparatus comprising a tank being generally curvilinear in cross-section and adapted to contain liquified gas, said tank being a pressure vessel for containing said gas under at least atmospheric pressure, and means for supporting said tank on said vessel, said supporting means including an annular skirt for thermally isolating said tank from said vessel, said skirt having upper and lower ends, with said lower end being integrally connected to said vessel and said upper end being integrally connected in tangential relation along a peripheral portion of said tank, separate means for maintaining a low temperature condition within said tank to maintain said gas in its liquid phase, and thermal insulation surrounding said skirt on at least the outer side thereof with respect to said tank and extending from the point of juncture of said skirt with said tank to a predetermined distance below the point of juncture of said skirt with the tank thereby to control the temperature gradient and thermal stresses produced in said skirt, whereby changes in the dimensional characteristics of said tank due to temperature changes in said tank are permitted independently of said vessel.*

*30. The apparatus as defined in claim 29 wherein said insulation is located on both the inner and outer sides of said skirt.*

*31. The apparatus as defined in claim 30 wherein said tank is covered on its outer surface with insulating material.*

* * * * *